United States Patent
Bauer et al.

(10) Patent No.: US 6,662,241 B1
(45) Date of Patent: Dec. 9, 2003

(54) APPARATUS AND METHOD FOR CONTROLLING A PERIPHERAL DEVICE

(75) Inventors: Andreas Bauer, Acton, MA (US); Todd Michael Sjolander, Grafton, MA (US); Stephen James Todd, Shrewsbury, MA (US); Kathleen R. Moxham, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/398,269

(22) Filed: Sep. 17, 1999

(51) Int. Cl.[7] .................................................. G06F 3/00
(52) U.S. Cl. ...................... 710/8; 710/5; 710/10; 710/104
(58) Field of Search ................ 710/8, 5, 10, 104; 707/4; 709/202

(56) References Cited

U.S. PATENT DOCUMENTS

| | | | | |
|---|---|---|---|---|
| 5,404,528 A | * | 4/1995 | Mahajan ..................... 709/318 |
| 5,838,683 A | * | 11/1998 | Corley et al. ............... 370/216 |
| 5,867,175 A | * | 2/1999 | Katzenberger et al. ...... 345/473 |
| 6,058,264 A | * | 5/2000 | Glaser .......................... 707/4 |
| 6,061,512 A | * | 5/2000 | Lin et al. ..................... 717/168 |
| 6,067,558 A | * | 5/2000 | Wendt et al. ................ 709/202 |
| 6,170,065 B1 | * | 1/2001 | Kobata et al. ................ 714/38 |

* cited by examiner

Primary Examiner—Jeffrey Gaffin
Assistant Examiner—Harold Kim
(74) Attorney, Agent, or Firm—Bromberg & Sunstein LLP

(57) ABSTRACT

A method and apparatus for controlling a peripheral device is provided. In a server, in a client/server environment, a server application receives a request for execution of a peripheral device script from a client application. The server application retrieves a peripheral device script which is associated with the request and the peripheral device script is passed to a script interpreter. The script interpreter converts the peripheral device script into at least one control signal. A device control module is coupled to the script interpreter and sends the control signal to the peripheral device. The device control module receives information signals from the peripheral device and forwards the information signals to the client application. The script may include code for configuring the peripheral device, code for requesting information about the peripheral device or code for controlling the peripheral device.

25 Claims, 4 Drawing Sheets

APPARATUS AND METHOD FOR CONTROLLING A PERIPHERAL DEVICE

FIELD OF THE INVENTION

This invention relates to computers, and more particularly to remotely controlling peripheral devices.

BACKGROUND ART

A script is a batch file which consists of a list of commands that can be executed without user interaction. A script differs from a program, in that, a program is compiled to physical machine code once and can then be run multiple times, whereas a script must be interpreted each time it is used and is not machine dependent. Scripting languages, such as Perl, provide strong file and text manipulation facilities and are often used for CGI script writing for World Wide Web page development. Such scripts allow World Wide Web (WWW) pages to be interactive. Information may be gathered by a webserver and information may be provided from the webserver to users accessing the WWW page. Although scripting languages allow the storage and retrieval of data, they are not directed to manage peripheral devices.

C++ based APIs exist that are designed to interface with specific hardware. Such APIs contains standard objects representative of the physical components of the hardware. By accessing these objects in a compilable C++ program, physical parameters of the hardware may be managed.

To remotely manage a specific hardware device using a C++ based API across a network, such as the WWW, a programmer must write a C++ compilable program. Since the management program must be compiled, the program is system dependent and will not run on different types of computers running different operating systems, making the program less than ideal for the WWW. Additionally to design a program for remote management of a peripheral device, the programmer needs to design a graphical user interface in C++ or another computer language, and have an extensive knowledge of the various physical subsystems to be managed and the related classes and subclasses of the API.

SUMMARY OF THE INVENTION

In accordance with one aspect of the invention, a method and apparatus for controlling a peripheral device is provided. In a server, in a client/server environment, a server application receives a request for execution of a peripheral device script from a client application. The server application retrieves a peripheral device script which is associated with the request and the peripheral device script is passed to a script interpreter. The script interpreter converts the peripheral device script into at least one control signal. A device control module is coupled to the script interpreter and sends the control signal to the peripheral device. The device control module receives information signals from the peripheral device and forwards the information signals to the client application. The script may include code for configuring the peripheral device, code for requesting information about the peripheral device or code for controlling the peripheral device. The client/server environment may operate in a network and the network may be the Internet.

In another embodiment, the system may include a peripheral device database which contains object representations of components of the peripheral device. The peripheral device may be configured by configuring the object representation of the peripheral device. Additionally, data concerning the peripheral device may be retrieved from the object representation of the peripheral device or one of the components of the peripheral device. In one embodiment, the peripheral device may be a disk storage array.

BRIEF DESCRIPTION OF THE DRAWINGS

The foregoing features of the invention will be more readily understood by reference to the following detailed description taken with the accompanying drawings.

DETAILED DESCRIPTION OF THE SPECIFIC EMBODIMENTS

Figure 1:
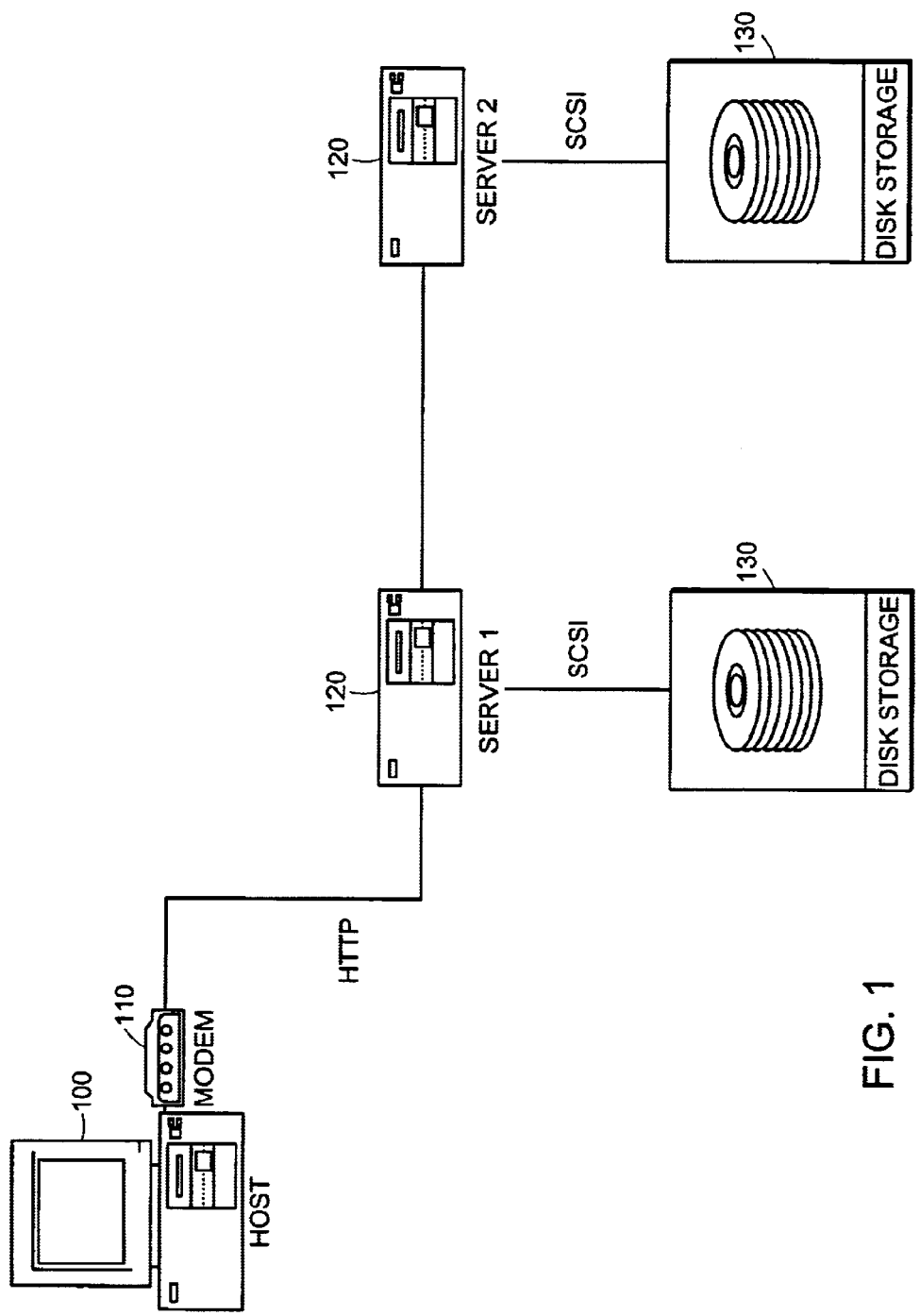
FIG. 1 is shows a preferred embodiment of the invention for a controlling a peripheral device connected to a web-server.

A scripting language directed at controlling peripheral devices is disclosed. The scripting language operates in conjunction with a script interpreter on a server in a client server environment. Pre-written scripts residing on the server are requested through an interface, such as a WWW page. The script may retrieve status information about a peripheral device, configure a peripheral device or control a peripheral device which is attached to the server. It should be obvious to someone of ordinary skill in the art that the script need not reside on the server, but only be pre-written and accessible to the server. For example, the script may be located on a removable media disk which is accessed by the server, or the script may be accessed by the server remotely through a network FIG. 1 shows a preferred embodiment of the invention for controlling a peripheral device connected to a server such as a data storage array, it should be understood by one skilled in the art that other peripheral devices may be used in place of the data storage array. Additionally a WWW server will provide the interface mechanism and is used for exemplary purposes. It should be understood that other communication interfaces are available for client/server communication.

The system operates as follows. A host computer 100 which has access to the World Wide Web through a modem 110 or other connection requests a web page from a server 120. In an alternative embodiment, the host computer is connected to the server via a network interface card. The server 120 in turn presents the web page through the Internet to the host computer. A user then selects a function to perform with regard to the peripheral device. For example, the user might wish to retrieve the serial number of a disk which is part of a disk array 130. The web page provides a selection mechanism such as a pull down menu for choosing the various selection options. Based on a selection made on the web page, the host computer 100 sends the selection to the server 120. The server 120 receives the selection and retrieves a script that is associated with the selection. The script is then sent to an interpreter. The interpreter parses the script, translates the individual lines of the script, and then executes each of the lines. Based on the selection chosen the script may request data from the data storage array, configure the data storage array, or send data to the data storage array. The requests are accomplished by accessing objects that model physical components of the data storage array. If there is an error in the step of interpreting, an error message is returned to the user. The script accesses functionality of the peripheral device and generates HTML code which is returned to the browser for viewing by the user.

The web page that is accessed by a client is a Graphical User Interface (GUI) for controlling, configuring, and requesting information about the disk array which is associated with the server. In the embodiment shown in FIG. 1, there are two servers each of which is connected to a data storage array. Each disk array may be accessed by the GUI through the associated server. In such a system, one server is running a webserver and the second server is in communication with the first server so that the disk array associated with the second server may be accessed through the WWW GUI interface. In another embodiment of the system, the second server provides a copy of the first server so that the first and second servers operate as a server cluster.

The scripting language that is used in conjunction with FIG. 1 for controlling the disk arrays referred to herein as RSL or RAID scripting language. RSL allows a developer to integrate the script with a separate graphical user interface, in a separate language thus the script may be bound together with external functionality that is not part of the core script language. This is achieved by having the executed script return values that are provided in HTML code. The output of the script is integrated into a World Wide Web page that is written in HTML code providing compatibility between RSL and HTML. In an alternative embodiment, the output of the script interpreter is provided in C++ format. This output may then be compiled in a C++ compiler, thus providing compatibility between RSL and C++.

In RSL, objects are not created and data may only be retrieved or set for pre-existing objects. The object structure of RSL simplifies the overall structure of an inherited object hierarchy by incorporating all of the functions which are available in both the parent and child objects in a global structure, so that, only a single object exists. In RSL there is no inheritance hierarchy and therefore typecasting is unnecessary. For example, in RSL all of the functions for all the various child objects/types of processors are encapsulated within one processor object. If a developer calls upon a function in the processor object which is not applicable for the hardware that exists in the physical system, the function returns a default value rather than failing or returning an error message.

RSL provides structured language components. RSL has a grammar which is context sensitive and recursive. RSL includes two basic data types: number and string. A number is a floating point number and a string is an arbitrary length string of characters. The number type is used to compute number data such as performance information or loop counters. The string type is used to hold strings which are needed as parameters for commands, functions, and procedures or to build output strings. RSL is provided with a number of variable types including, number, string, stringlist, file, and reference. Stringlist holds an array of strings and the Reference data type provides a pointer to an existing object. Additionally, RSL has various tokens and operators in the grammar which define essential semantics of the language, such as print, while, if, function,;+,=etc. These tokens and operators provide basic flow control, such as, while and for loops and if-then-else statements. Output is accomplished with the print command which places strings or numbers in the output stream. RSL includes both procedures and functions for structurally implementing the tokens and operators. Procedures are defined prior to being used and have no return value. Functions have a return value and the return value is defined during the declaration of the function. As with procedures, functions may have any number of parameters. RSL objects may be called and accessed through use of the operators. These RSL objects replicate the physical disk array and include a Battery, a Cabinet, a Disk, a Fan, a Power supply, and a Storage Processor all of which are subsystems of the peripheral device. Each object contains associated functions which are part of the object which allow access to the data associated with the object. For example, a script may request the number of fans that are present within a cabinet, by calling the GetNumberOfFans function of the Cabinet object. Additional elaboration concerning tokens, operators, objects, procedures, functions, and grammar statements for RSL can be found in the attached appendix.

Figure 2:
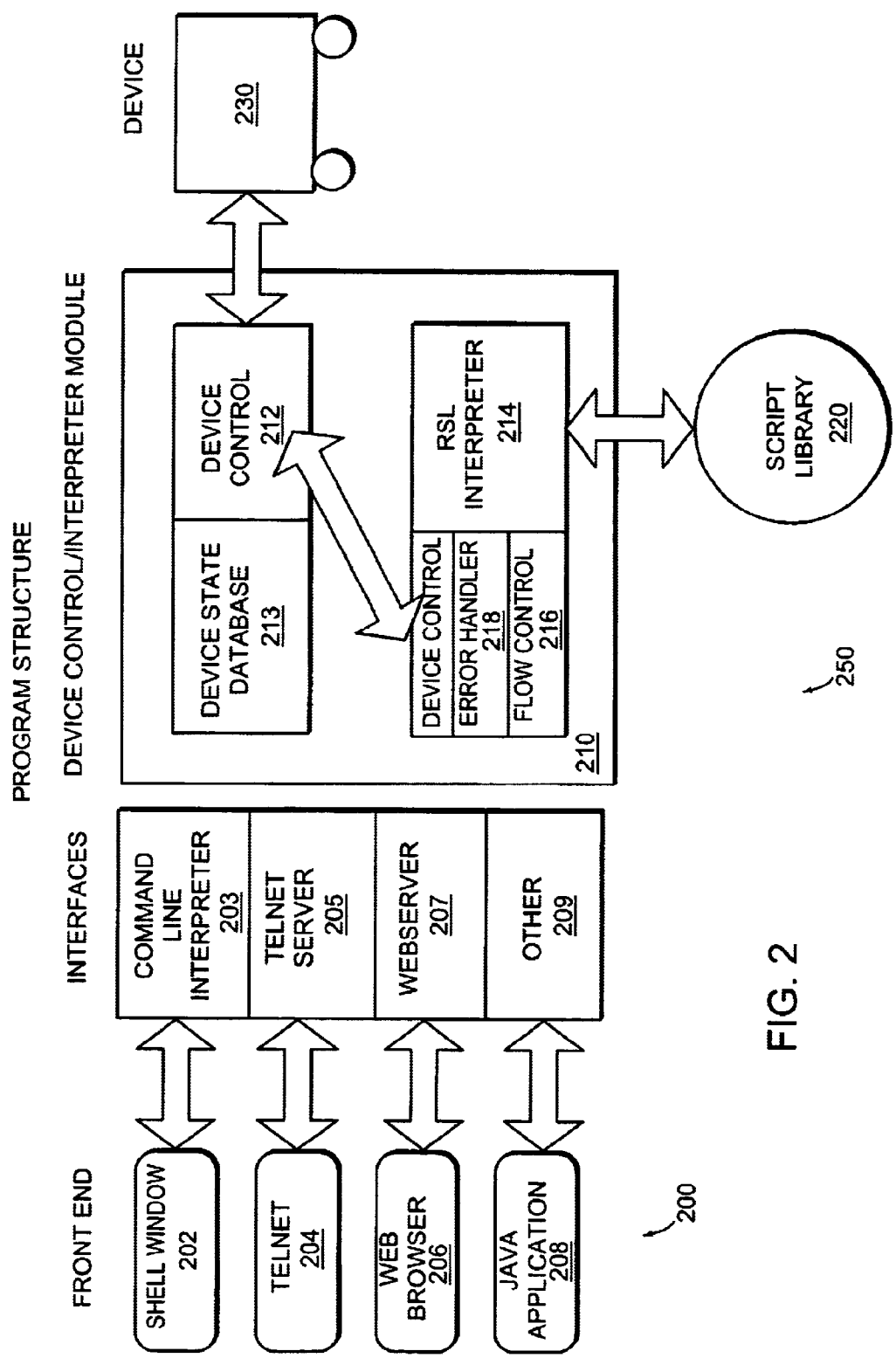
FIG. 2 shows a block diagram of the various interface implementations that may be presented in connection with the scripting language and interpreter that resides on an agent.

FIG. 2 shows a block diagram of the various interface implementations that may be presented in connection with the scripting language and interpreter that resides on the server 250. Interfaces 203, 205, 207, 209 for a Shell Window, Telnet, a Web Browser or Java Applications may be linked to the script interpreter module 210. Additionally, the block diagram shows the other internal components that are present within the server 250. In one embodiment, the server may be composed of a single processor which performs the following functions. When a request is made through either the Shell Window 202, Telnet window 204, Web Browser 206, or through a Java Application 208, the corresponding interface receives the request and passes the request to the flow control module 216. The flow control module 216 identifies the request and locates the corresponding script from the script library 220. The script library 220 is a memory location of the server which contains various pre-written scripts. The script is then passed into the interpreter 214. The interpreter 214 parses the script file and translates the script into commands. The commands are then executed.

The server 250 also contains a device control module 212 for coupling the peripheral device to the interpreter 214. The device control module 212 receives and sends data to the peripheral device 230. At periodic intervals or upon a specific request from a host the peripheral device 230 is polled for various information. For example, if the peripheral device 230 is a disk array, the device may be polled for the RPMs of the disk, the amount of data stored on the disk, the amount of free space available on the disk, the number of corrupted sectors of the disk or other information. The data is received by the device control module and is stored in a device state database module 213. If the script requests an update of the state of the peripheral device, data may be retrieved from the device state database and then passed back through the appropriate interface to the user at the front end or the script may request a fresh update of data from the peripheral device 230 prior to sending the information to the front end 200. Whether the device state database 213 is accessed depends on the time sensitivity of the data requested by the script. The server also includes an error handler module 218 for sending error messages to the host in the event that a script fails, or contains an unidentifiable token.

Figure 3:
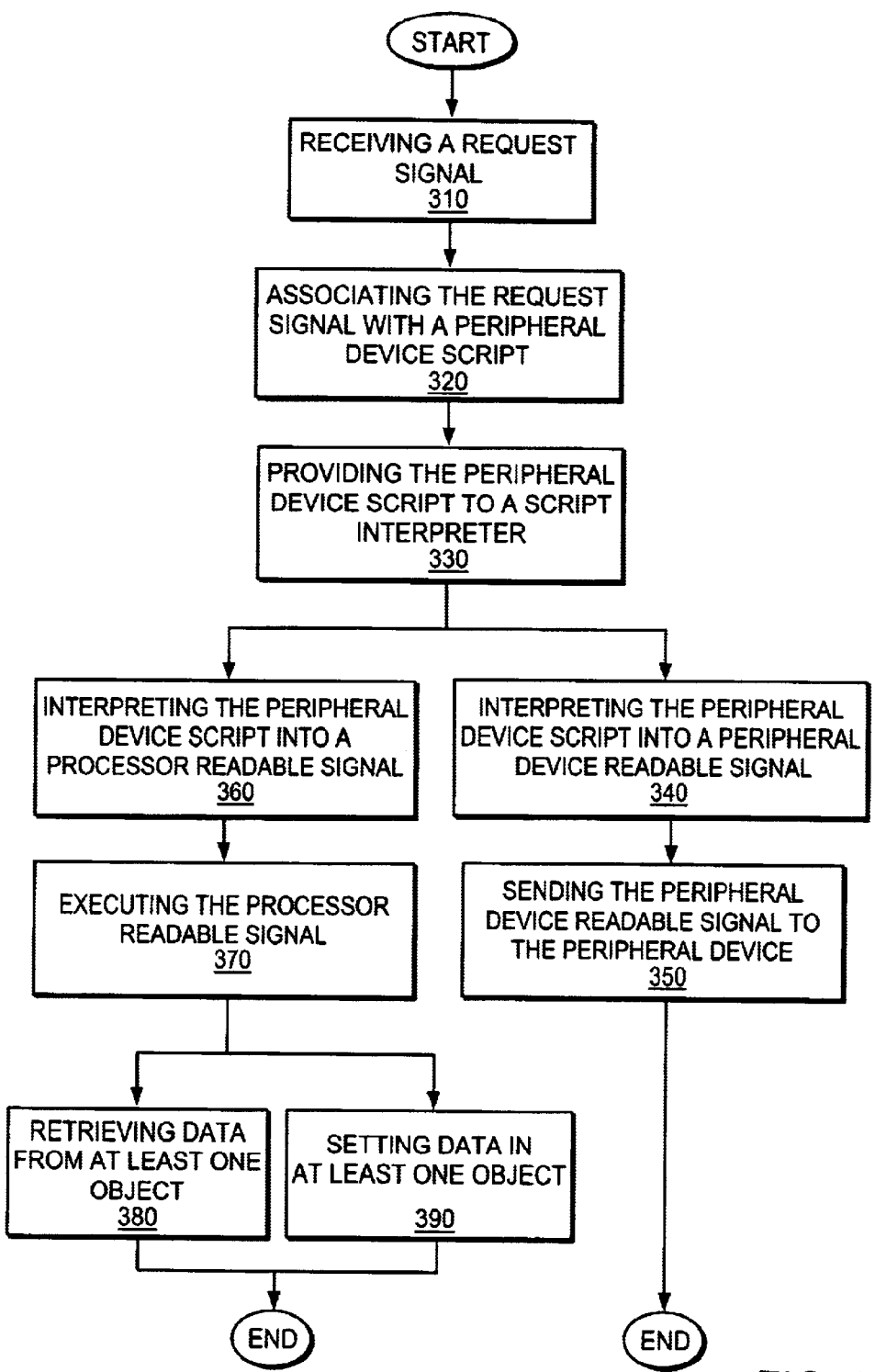
FIG. 3 is a flow chart showing the steps taken when a request is made by a client to the server to control a remotely located peripheral device.

FIG. 3 is a flow chart showing the steps taken when a request is made by a client to the server to control a remotely located peripheral device. A user operating the client application first decides upon a function to perform on the peripheral device. The user may make a selection with a World Wide Web Page or the user may input a command word in a command line interface. The user may wish to either configure, control or receive information about the peripheral device. The client application takes the user's selection and converts the selection into a signal which is sent to the server. If the user makes a request for time sensitive data, the server first receives a request signal (310). The server then associates the request signal with a peripheral device script (320). The peripheral device script is provided to the script interpreter (330). The script interpreter interprets the peripheral device script into a peripheral device readable signal so that the peripheral device may be polled for data (340). The signal is then sent to the device wherein data is retrieved from the peripheral device (350). Once the data is retrieved it is directed back to the client application through the user interface or the data returned back to the server wherein the data is updated in the device database and then passed back to the client application. Where the peripheral device data is not time sensitive or where the user chooses to configure the peripheral device, the script is interpreted into a processor readable signal (360). This processor readable signal accesses the required objects in the device database when the script is executed (370). Data may be set in the object (390) or data is retrieved from the object (380). If data is retrieved the data is then passed back to the client application through the server.

Figure 4:
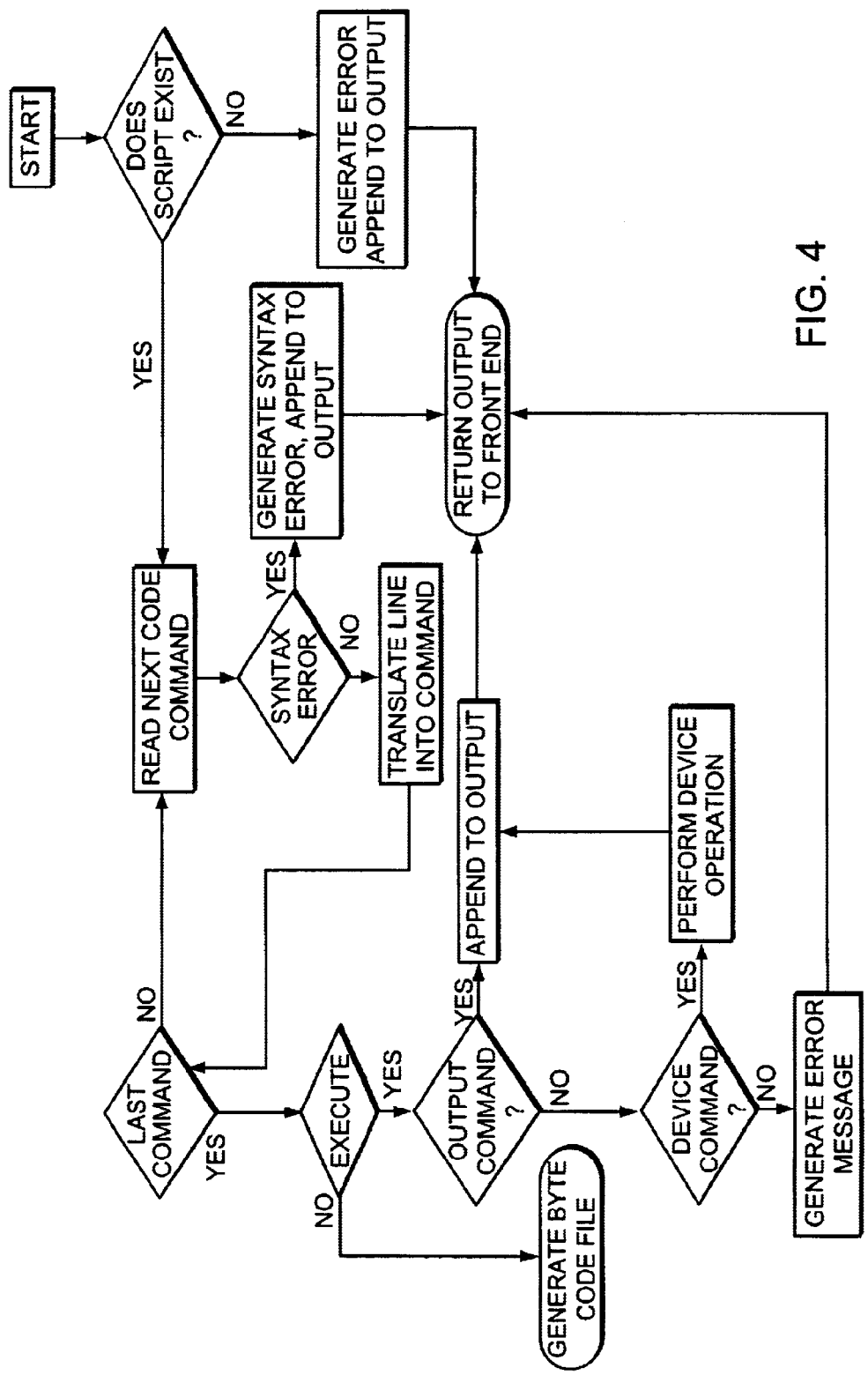
FIG. 4 shows a flow chart of the steps applied in the flow control of a script's execution.

FIG. 4 shows a flow chart of the steps applied in the flow control of a script's execution. Flow control is performed in the flow control module of FIG. 2 and interacts with the interpreter. First, the script file is requested from the script library by the interpreter. The interpreter attempts to access the file. If the file is not present the interpreter generates an error message and appends it to the output which is sent to the front end. If the script file exists the interpreter parses the file until the first token is found. A lexical analyzer marks the location of the token and denotes the starting and ending points associated with the syntax of the code. If there is an error in the syntax of the token a syntax error is generated and appended to the output. If there is no error the command is translated into machine recognizable commands. Translation may occur by accessing precompiled commands for each token in a script or the interpreter may create machine readable code as each token is encountered. The interpreter then continues to parse the script file looking for the next token until an end of file token is encountered. If the end of file token is found the translated script file is then executed or a byte code file is generated for future execution. If the command is not time sensitive, it is an output command. The command is executed, the device database is accessed and the result is appended to the output file. For example, the script may have had a getLunNumber command for a particular disk. The command accesses the device state database and finds the LUN number of the disk and returns the value to the output. If the command is a device command, the device operation is performed and if output is part of the device command it is appended to the output. An example of a device command might be getdiskRPM. This command is time sensitive, so the device database is bypassed. The request would access a sensor connected to the disk and send a signal back to the processor which would calculate the RPM value. The RPM value would be returned and appended to the output. If the command failed then an error message would be generated and added to the output.

In an alternative embodiment, the disclosed apparatus and method for controlling a peripheral device may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A system for processing peripheral device scripts, the system comprising:
    a script interpreter for converting a peripheral device script containing configuration commands that are interpretable by the script interpreter for configuring a peripheral device into at least one control signal wherein the control signal implements the configuration command;
    a device interface for sending the at least one control signal to a peripheral device and receiving an information signal from the device; and
    a server application for receiving a script request from a client application, forwarding a peripheral device script to the script interpreter, and sending the information signal to the client application.

2. A system according to claim 1, wherein the peripheral device is a disk storage array.

3. A system according to claim 1, wherein the at least one control signal is capable of configuring the peripheral device.

4. A system according to claim 1, further comprising:
    a peripheral device database containing object representations.

5. A system according to claim 4, wherein the at least one control signal contains at least one object request for at least one object representation in the peripheral device database.

6. A system according to claim 5, wherein the at least one object request configures a parameter of an object representation in the peripheral device database.

7. A system according to claim 4, wherein the object representations represent physical components of the peripheral device.

8. A system according to claim 4, wherein one of the object representations represent a storage processor.

9. A system according to claim 4, wherein an object representation represents a disk storage array.

10. A system according to claim 4, wherein one of the object representations represents a subsystem of the peripheral device.

11. A system according to claim 1, wherein the client application is coupled to the server application through a network.

12. A system according to claim 11, wherein the network is the Internet.

13. A system for obtaining peripheral configuration information from a peripheral device, the system comprising:
   a script file containing peripheral device requests;
   a script interpreter for receiving the script file and interpreting the peripheral device requests into a control signal wherein the control signal implements the peripheral device requests;
   a device control module coupled to the script interpreter and the peripheral device for sending the control signal to the peripheral device and receiving an information signal containing peripheral device configuration information.

14. The system according to claim 13, wherein the peripheral device is a data storage array.

15. The system according to claim 13, further comprising:
   an interface module for receiving a request for an action, associating the action with a script and providing the script to the script interpreter.

16. A method for controlling a peripheral device coupled to a processor, the method comprising:
   receiving a request signal in the processor;
   associating the request signal with a peripheral device script;
   providing the peripheral device script to a script interpreter;
   interpreting the peripheral device script containing peripheral device configuration commands into a peripheral device readable signal for configuring the peripheral device;
   sending the peripheral device readable signal to the peripheral device.

17. A method according to claim 16, further comprising:
   sending a request signal from a remote client application to the processor.

18. A method according to claim 16, wherein the peripheral device is a data storage array.

19. A method for accessing data representative of a peripheral device coupled to a processor, the method comprising:
   receiving a request signal in the processor;
   associating the request signal with a peripheral device script;
   providing the peripheral device script containing a command for requesting information from a peripheral device to a script interpreter;
   interpreting the peripheral device script into a peripheral device readable signal wherein the peripheral device readable signal implements the command for requesting information from a peripheral device;
   sending a data signal containing configuration information from the peripheral device to an object in a device database; and
   storing the configuration information from the data signal in the object.

20. The method according to claim 19, further comprising:
   sending a request signal from a client application to the processor.

21. The method according to claim 19 further comprising:
   sending the data from the object to a client application.

22. The method according to claim 19, further comprising:
   requesting at a client from the processor access to a world wide web page;
   sending to the client the world wide web page;
   selecting a function on the world wide web page associated with a peripheral device script;
   converting the selected function into a request signal; and
   sending the request signal from the client to the processor.

23. A computer program on a computer readable medium, the computer program comprising:
   computer code for receiving a request signal in a processor of a server;
   computer code for associating the request signal with a peripheral device script;
   computer code for providing the peripheral device script to a script interpreter;
   computer code for interpreting the peripheral device script containing configuration commands that are interpretable by the script interpreter into a peripheral device readable signal wherein the peripheral device readable signal implements the configuration command for configuring the peripheral device; and
   computer code for sending the peripheral device readable signal to the peripheral device.

24. A computer program according to claim 23, wherein the peripheral device is a data storage array.

25. A computer program on a computer readable medium for accessing configuration data representative of a peripheral device coupled to a processor, the computer program comprising:
   computer code for receiving a request signal in the processor;
   computer code for associating the request signal with a peripheral device script;
   computer code for providing the peripheral device script to a script interpreter;
   computer code for interpreting the peripheral device script containing a peripheral device information retrieval command into a peripheral device readable signal wherein the peripheral device readable signal implements the information retrieval command; and
   computer code for receiving a data signal containing configuration data from the peripheral device in response to the peripheral device readable signal.

* * * * *